(12) United States Patent
Litwin (10) Patent No.: US 7,296,410 B2
(45) Date of Patent: Nov. 20, 2007

(54) SOLAR POWER SYSTEM AND METHOD FOR POWER GENERATION

(75) Inventor: Robert Z. Litwin, Canoga Park, CA (US)

(73) Assignee: United Technologies Corporation, Hartford, CT (US)

( * ) Notice: Subject to any disclaimer, the term of this patent is extended or adjusted under 35 U.S.C. 154(b) by 802 days.

(21) Appl. No.: 10/732,495

(22) Filed: Dec. 10, 2003

(65) Prior Publication Data

US 2005/0126170 A1    Jun. 16, 2005

(51) Int. Cl.
*F03G 7/00*    (2006.01)
(52) U.S. Cl. .................. 60/641.12; 60/641.15
(58) Field of Classification Search ............. 60/641.8, 60/641.11, 641.15, 641.12
See application file for complete search history.

(56) References Cited

U.S. PATENT DOCUMENTS

| | | | | |
|---|---|---|---|---|
| 4,136,674 A | * | 1/1979 | Korr | ............... 126/607 |
| 4,149,523 A | * | 4/1979 | Boy-Marcotte et al. | ...... 126/589 |
| 4,159,629 A | * | 7/1979 | Korr et al. | ............... 60/641.15 |
| 4,222,365 A | | 9/1980 | Thomson | |
| 4,234,351 A | | 11/1980 | Deminet et al. | |
| 4,238,265 A | | 12/1980 | Deminet | |
| 4,362,149 A | | 12/1982 | Thomson | |
| 4,394,859 A | * | 7/1983 | Drost | ............... 126/647 |
| 4,438,630 A | * | 3/1984 | Rowe | ............... 60/676 |
| 4,512,336 A | * | 4/1985 | Wiener | ............... 126/651 |
| 4,608,964 A | * | 9/1986 | Russo | ............... 126/688 |
| 4,815,443 A | | 3/1989 | Vrolyk et al. | |
| 4,947,825 A | | 8/1990 | Moriarty | |
| 5,054,466 A | * | 10/1991 | White et al. | ............... 126/690 |
| 5,096,505 A | | 3/1992 | Fraas et al. | |
| 5,118,361 A | | 6/1992 | Fraas et al. | |
| 5,417,052 A | * | 5/1995 | Bharathan et al. | ............ 60/783 |
| 5,444,972 A | | 8/1995 | Moore | |
| 5,850,831 A | | 12/1998 | Marko | |
| 5,862,800 A | | 1/1999 | Marko | |
| 6,442,937 B1 | | 9/2002 | Stone et al. | |
| 6,476,314 B2 | | 11/2002 | Bauman et al. | |
| 6,480,366 B1 | | 11/2002 | Cordaro | |
| 6,531,653 B1 | | 3/2003 | Glenn et al. | |
| 6,532,953 B1 | | 3/2003 | Blackmon et al. | |
| 6,557,804 B1 | | 5/2003 | Carroll | |
| 6,899,097 B1 | * | 5/2005 | Mecham | ............... 126/591 |

OTHER PUBLICATIONS

Sandia Corporation, *Concentrating Solar Power Overview*—Aug. 28, 2003; eight pages; http://www.energylan.sandia.gov/sunlab/overview.htm.
KJC Operating Company, *Solar Technology*—Aug. 28, 2003; two pages; http://www.kjcsolar.com/solar_2.html.

\* cited by examiner

*Primary Examiner*—Hoang Nguyen
(74) *Attorney, Agent, or Firm*—Alston & Bird LLP (57) ABSTRACT

A solar-powered power generation system and an associated method are provided. The system includes at least one trough solar absorption device for heating a heat transfer fluid to a first temperature, and at least one tower solar absorption device for further heating the transfer fluid to a second temperature. Thus, the generation system can efficiently heat the transfer fluid to high temperatures. Subsequently, the heated fluid can be used, e.g., to generate steam and/or electricity.

33 Claims, 5 Drawing Sheets

SOLAR POWER SYSTEM AND METHOD FOR POWER GENERATION

BACKGROUND OF THE INVENTION

1) Field of the Invention

The present invention relates to the generation of power from solar energy, and, in particular, relates to a solar power system having both trough and tower solar absorption devices.

2) Description of Related Art

Figure 1:
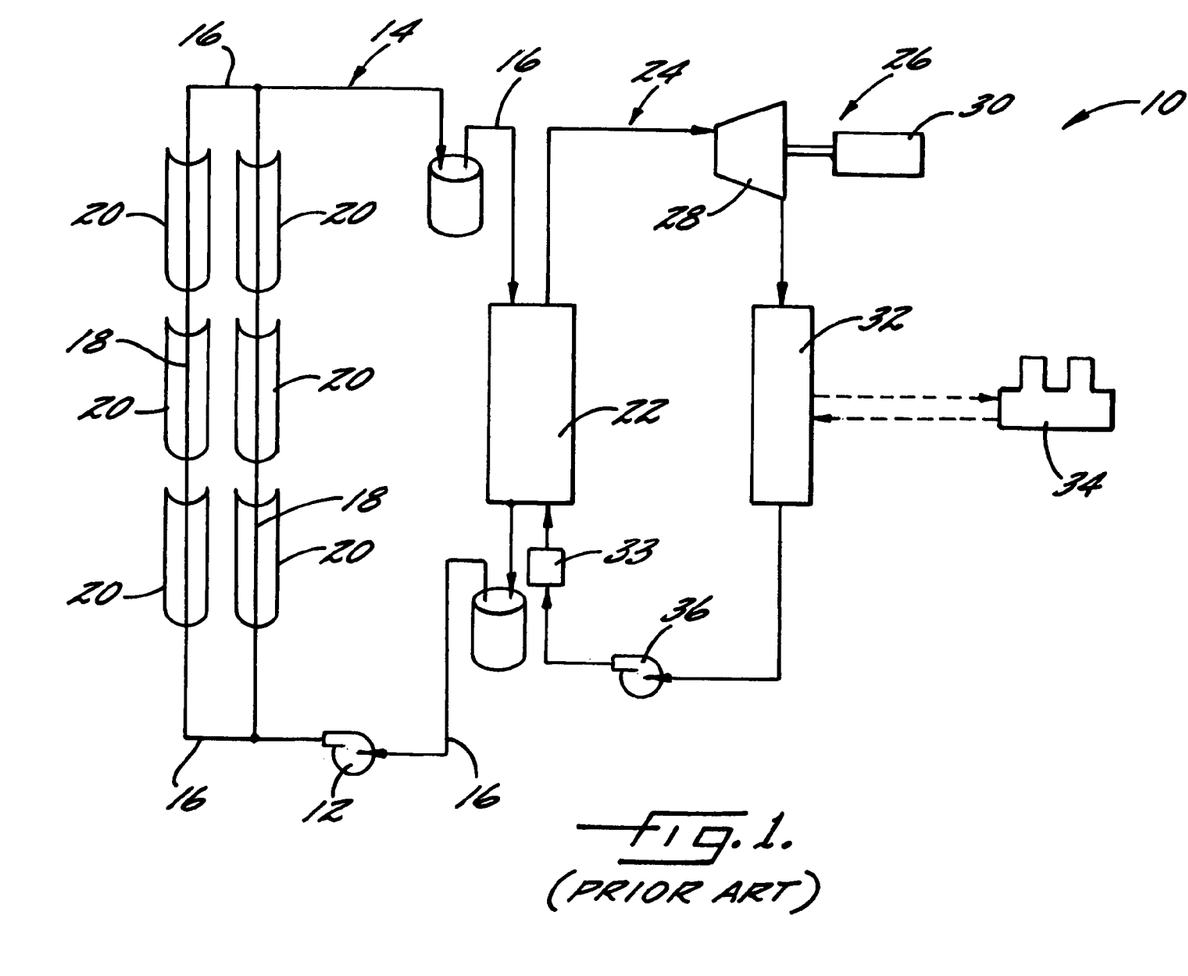
FIG. 1 is a schematic view illustrating a conventional trough-type solar power plant.

Two conventional solar power generation systems are the trough- and tower-type solar-powered electrical generation plants. In a trough solar power plant 10, as illustrated in FIG. 1, a pump 12 circulates a heat transfer fluid such as hydrocarbon or synthetic oil through a fluid circuit 14 including a plurality of pipes 16 and trough receivers 18. Each trough receiver 18 includes an absorber tube for circulating the heat transfer fluid and an evacuated glass cylinder that surrounds, and thereby insulates, the tube. Parabolic sun-tracking mirrors 20, referred to as collectors, are configured to reflect sunlight toward the receivers 18 to heat the fluid therein. The heated fluid is then delivered to a steam generator 22, in which thermal energy is exchanged from the heat transfer fluid to water circulating in a separate fluid circuit 24. The heat transfer fluid is thereby cooled in the steam generator 22 and can then be re-circulated to the receivers 18 for reheating. The water heated in the steam generator 22 forms steam that is circulated to a turbine generator 26, i.e., a turbine 28 coupled to an electrical generator 30. The steam expands and rotates the turbine 28 and the generator 30 and thus produces electricity. The steam can be passed through a condenser 32 that, in conjunction with a cooling tower 34, condenses the steam to form hot water that is further heated in a preheater 33 and can be circulated back to the steam generator 22 by a pump 36 for re-use.

The pipes 16 and receivers 18 of the circuit 14 containing the heat transfer fluid lose thermal energy to the environment. The loss of energy generally increases as the temperature of the heat transfer fluid is increased beyond the ambient temperature. Thermal losses from the fluid circuit 14 can be reduced by insulating the pipes 16 and coating the receivers 18 with a selective coating, i.e., a material characterized by a low emissivity that maintains high thermal absorptivity. However, conventional selective coatings are destroyed by prolonged exposure to excessive temperatures. To avoid destruction of the selective coating, the heat transfer fluid in a trough solar power plant 10 is typically only heated to a maximum temperature of about 750° F. or less, thereby limiting the temperature of the steam generated to about 700° F. The maximum operation temperature is also limited according to the oil or other heat transfer fluid that is used, as conventional oil fluids break down or undergo phase changes at temperature above about 750° F. Turbine generators operate at higher efficiencies at higher operating temperatures, and typically operate at an efficiency of about 32% for the typical operating temperature of a trough solar power plant.

Figure 2:
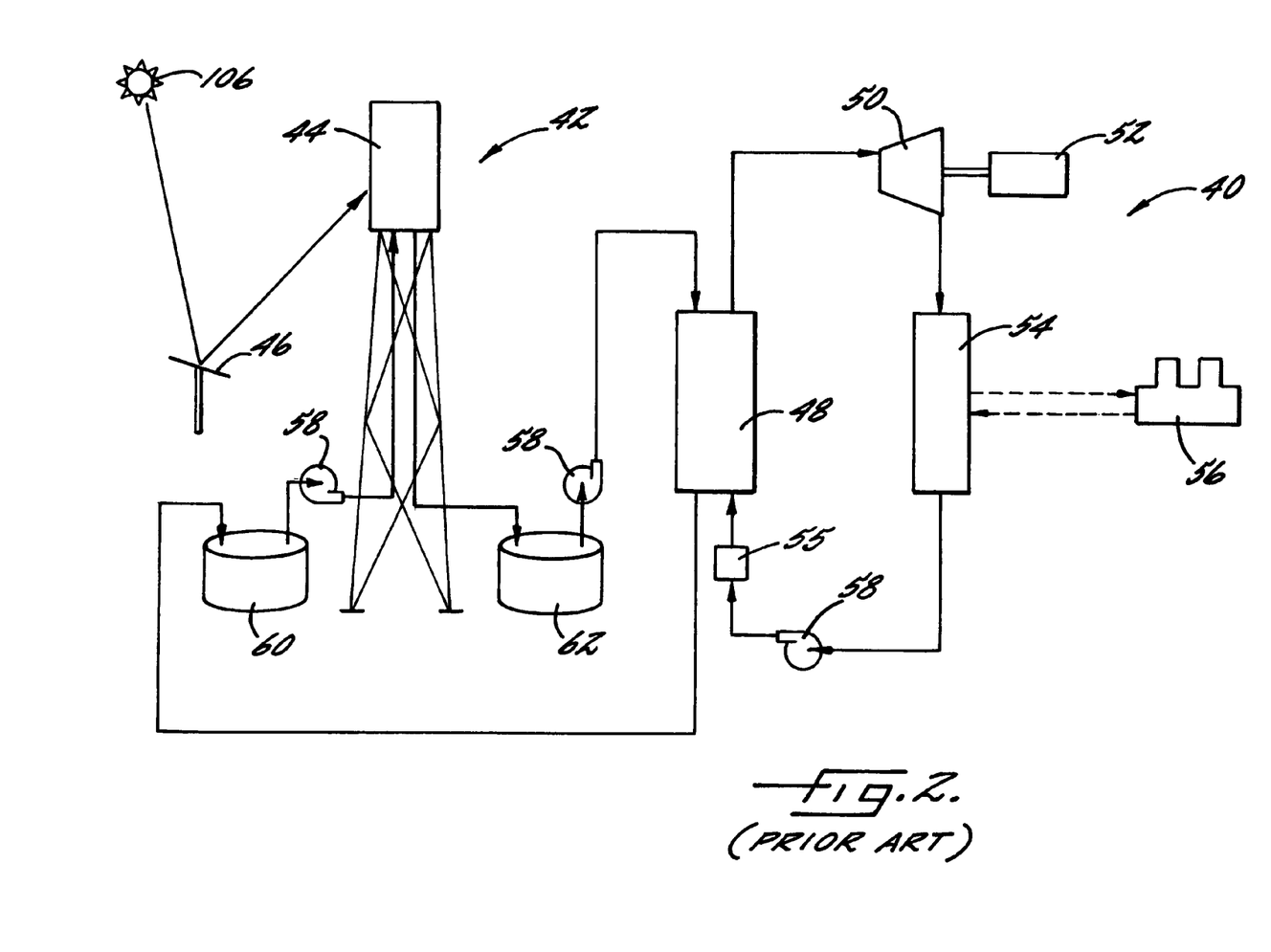
FIG. 2 is a schematic view illustrating a conventional tower-type solar power plant.

Higher operating temperatures can be achieved in a tower-type solar power plant 40, as illustrated in FIG. 2, in which the heat transfer fluid is circulated to a tower 42 that includes an absorption device, also referred to as a receiver 44. The receiver 44 of the tower 42 includes serpentine tubes that receive the heat transfer fluid. A plurality of heliostats 46 are configured to reflect sunlight toward the receiver 44, thereby heating the fluid within. Each heliostat 46 is a sun-tracking mirror configured to change position according to the direction of the sun 106 so that the heliostats 46 reflect solar energy onto the receiver 44 despite the continuous movement of the sun 106. The heat transfer fluid is delivered from the tower 42 to a steam generator 48, where thermal energy is exchanged to water, forming steam and generating electricity as described above using a turbine 50 and electrical generator 52. The steam is then condensed in a condenser 54 with the use of a cooling tower 56, and the water is preheated in a preheater 55 and re-circulated to the steam generator 48. Pumps 58 can be used to circulate the heat transfer fluid and the water in the respective fluid circuits, and tanks 60, 62 can be used to store the heat transfer fluid before and after heating by the receiver 44, respectively.

The surface area of the receiver 44 of the tower solar power plant 40 is typically significantly less than the surface area of the receivers 18 of the trough solar power plant 10. Thus, the receiver 44 of the tower-type solar power plant 40 generally suffers less heat loss than the receivers 18 of the trough solar power plant 10, even without the use of low emissivity coatings, and despite operation at higher temperatures to about 1050° F. Further, since the tower 42 can typically heat the heat transfer fluid to higher temperatures, steam can be heated to about 1000° F. The heat transfer fluid can be a molten salt, which is chemically stable to temperatures of 1100° F. and has a high boiling point. However, such salts generally have freezing temperatures greater than those of oils typically used in trough solar power plants. Therefore, if sufficient solar power is not available for heating the molten salt, the fluid is typically electrically heated or drained from the receiver 44 to prevent the salt from solidifying therein.

The higher steam temperature associated with the operation of the tower solar power plant 40 allows the turbine 50 and electrical generator 52 to operate at a higher efficiency than that achieved with the lower temperatures associated with the trough solar power plant 10. Thus, the tower solar power plant 40 can achieve a higher overall efficiency, but the trough solar power plant 10 costs less to operate at low operating temperatures, i.e., up to about 750° F.

Thus, there exists a need for an improved solar-powered power generation system. Preferably, the system should be capable of heating a transfer fluid to high operating temperatures typically associated with tower solar power plants. The system should also provide inexpensive heating of the transfer fluid, as is associated with typical trough solar power plants.

BRIEF SUMMARY OF THE INVENTION

The present invention provides a solar-powered power generation system and an associated method. The system includes at least one trough solar absorption device for heating a heat transfer fluid, such as a molten salt, to a first temperature, and a tower solar absorption device for further heating the transfer fluid to a second temperature. Thus, the generation system can cost effectively and efficiently heat the transfer fluid to high temperatures.

According to one embodiment of the present invention of the solar-powered power generation system, each trough solar absorption device has a receiver defining a passage for receiving the heat transfer fluid and a solar collector, such as a parabolic mirror, configured to direct solar radiation toward the receiver to heat the heat transfer fluid therein. The tower solar absorption device, which is configured to receive the heat transfer fluid from the trough solar absorption devices, also includes a receiver for receiving the heat transfer fluid and a solar collector, such as one or more heliostats, configured to direct solar radiation toward the receiver to heat the heat transfer fluid. The fluid can be received from the tower solar absorption device by a power generator that removes thermal energy from the heat transfer fluid, thereby cooling the heat transfer fluid. For example, the power generator can include a steam generator that uses thermal energy from the heat transfer fluid to generate steam. The steam can be used to rotate a turbine and an electrical generator to generate electricity. In one embodiment, the heat transfer fluid is a molten salt, which can be heated to a first temperature in the trough devices, e.g., between about 650° F. and 850° F., then to a second, higher temperature in the tower device, e.g., between about 850° F. and 1100° F., before being cooled in the power generator to a third temperature, e.g., between about 450° F. and 650° F. The power generation system can also include storage tanks configured to receive the transfer fluid from and/or deliver the transfer fluid to the trough receivers, the tower receivers, and the power generator.

The present invention also includes a method of generating power using solar energy. According to one embodiment, the method includes delivering a heat transfer fluid through at least one trough solar absorption device, reflecting solar energy toward a receiver of the trough solar absorption device to heat the heat transfer fluid therein to a first temperature, delivering the heat transfer fluid from the trough solar absorption device to a tower solar absorption device, and reflecting solar energy toward a receiver of the tower solar absorption device to heat the heat transfer fluid therein to a second, higher temperature. The heated fluid is delivered to a power generator where the heat transfer fluid is cooled, e.g., to generate steam using thermal energy from the heat transfer fluid. The steam can be used to rotate a turbine and generate electricity. In one embodiment of the present invention, the trough solar absorption device can heat the fluid to a temperature of between about 650° F. and 850° F., the tower solar absorption device can heat the fluid to a temperature of between about 850° F. and 1100° F., and the power generator can cool the fluid to a temperature of between about 450° F. and 650° F. In addition, the fluid can also be stored in one or more tanks between each of the operations of the method.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 3:
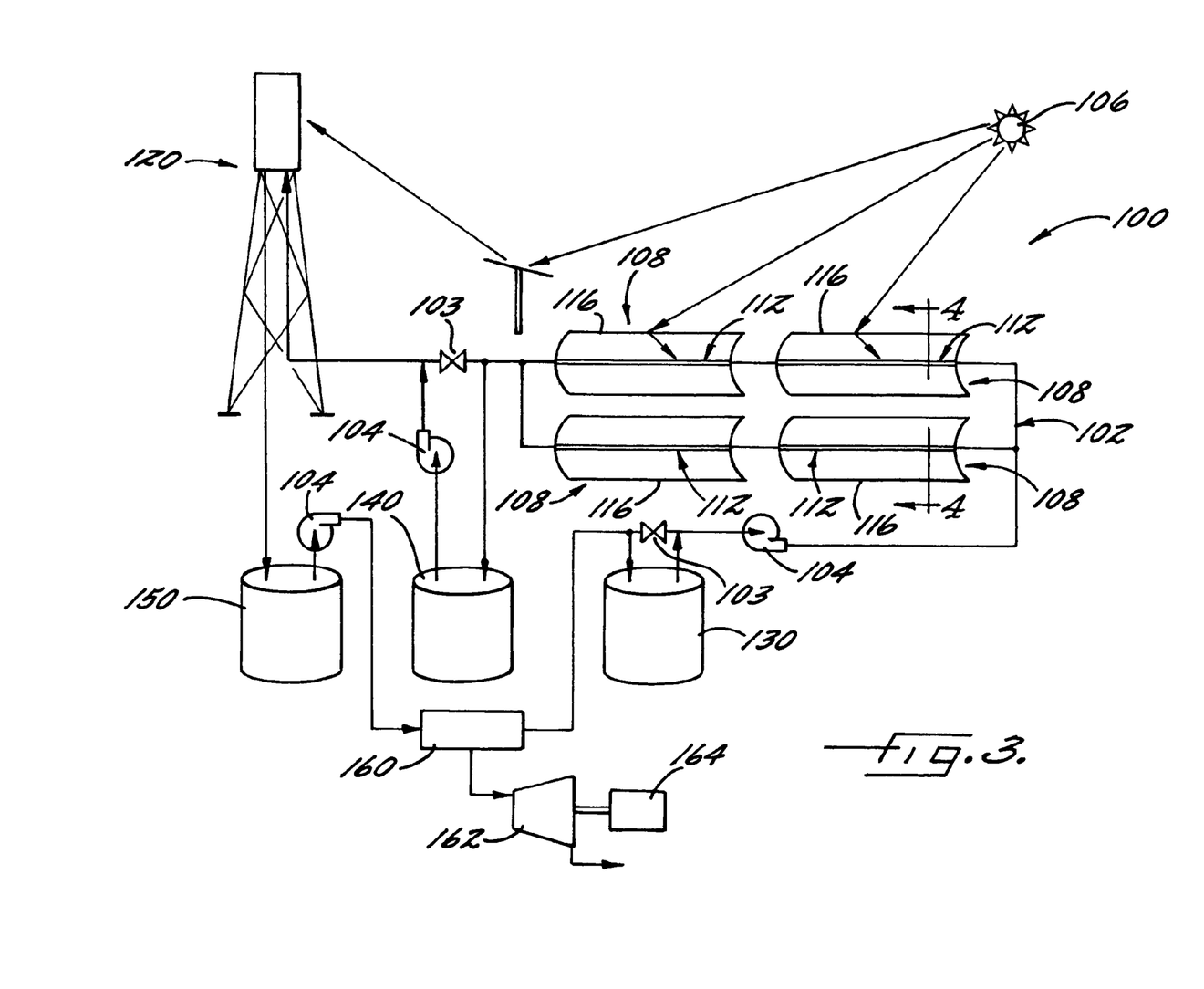
FIG. 3 is a schematic view illustrating a solar-powered power generation system according to one embodiment of the present invention.

Referring now to the figures and, in particular, FIG. 3, there is shown a solar-powered power generation system 100 according to one embodiment of the present invention. The system 100 generally includes a fluid circuit 102 for circulating a heat transfer fluid through at least one trough solar absorption device 108 and subsequently through a tower solar absorption device 120, so that the heat transfer fluid is heated in at least a two-stage operation. It will be appreciated that the system 100 can define a variety of configurations, FIG. 3 illustrating only one exemplary configuration. The fluid circuit 102 can be formed of a network of pipes, tubes, or other passage-defining components, and the system 100 can include components in addition to those shown, e.g., reservoirs, valves, and other devices for accommodating and controlling the flow of the heat transfer fluid. For example, one or more pumps 104 can be provided at various positions in the system 100 for fluidly circulating the heat transfer fluid. Valves 103 or other flow regulation devices can be used to control the flow of fluid through the various portions of the fluid circuit 102. Further, the operation of the system 100 can be controlled by a controller, such as a computer, programmable logic controller, or other electrical processing device.

Various types of heat transfer fluids can be used with the system 100. According to one embodiment of the invention, the heat transfer fluid is a molten salt and, in particular, a nitrate salt including about 60% sodium nitrate and about 40% potassium nitrate. This nitrate salt is generally useful in a temperature range of about 450° F. to 1100° F. At temperatures below about 450° F., the salt begins to solidify, increasing the resistance to flow. At temperatures above about 1100° F., the salt begins to react chemically to form nitrites, which are generally more corrosive than the nitrate salt. Within the range of 450° F.-1100° F., the nitrate salt generally exists as a single phase, i.e., a liquid, such that density of the fluid is substantially uniform throughout the operation of the system 100. Alternative heat transfer fluids include other liquid salts as well as oils and other fluids. The heat transfer fluids can be selected according to the desired and anticipated temperature variation of the fluid in the system 100.

Figure 4:
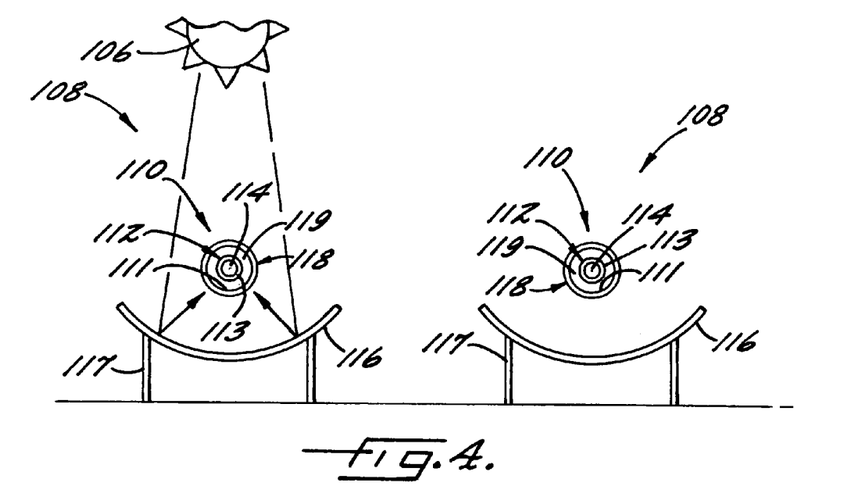
FIG. 4 is a section view in elevation of the trough solar absorption device of the generation system of FIG. 3 as seen along line 4-4.

As shown in FIG. 3, the fluid is circulated through the circuit 102 from a cold thermal storage tank 130 to a plurality of trough solar absorption devices 108. Any number of the trough devices 108 can be provided, and the trough devices 108 can be arranged in parallel and/or series configurations so that the heat transfer fluid is heated contemporaneously and/or consecutively in the different devices 108. The trough devices 108, which are illustrated in FIG. 4, are configured to collect solar energy and reflect the solar energy to be absorbed by the heat transfer fluid. For example, each trough device 108 includes a receiver 110 that defines a passage 114 for receiving the heat transfer fluid as the fluid is circulated through the system 100. Each of the trough devices 108 also includes a solar collector 116 that is configured to direct solar radiation toward the receiver 110 to heat the heat transfer fluid therein. For example, the solar collector 116 can include one or more mirrors, such as the parabolic mirrors shown in FIG. 4, that reflect light from the sun 106 toward the receivers 110. The solar collectors 116 can be adjustable in position and configuration so that the solar collectors 116 can follow the sun 106 during the sun's relative movement so that solar energy from the sun 106 is reflected toward the receivers 110 regardless of the relative position of the sun 106. For example, each solar collector 116 can be rotatably mounted on a stationary base 117 or other structure and rotatably adjusted by one or more motors or other actuation devices in response to a detector or sensor that tracks the relative position of the sun 106. Alternatively, the solar collectors 116 can be adjusted according to a preprogrammed algorithm or otherwise predetermined schedule.

In other embodiments of the present invention, the trough devices 108 can include other types of solar collectors 116. For example, the solar collectors 116 can include a lens, such as a fresnel lens, in addition or alternative to the parabolic mirror. Further, each solar collector 116 can include secondary parabolic mirrors, and the secondary parabolic mirrors and/or the lenses can be configured to heat the receivers 110 at varying rates for preheating the receivers 110 before the fluid is circulated and/or thawing solidified fluid in the receivers 110. Solar collection devices that include multiple mirrors, lenses, and combinations of mirrors and lenses are described further in U.S. application Ser. No. 10/731,951, titled "Solar Collector and Method," filed number for the missing information concurrently herewith and assigned to the assignee of the present invention, and the contents of which is incorporated herein in its entirety by reference.

The receivers 110 of the trough devices 108 typically include an absorber tube 112 or other fluid reservoir or conduit, which is surrounded by a glass tube 118 that extends concentrically around the absorber tube 112. A space 119 is defined between the inner surface 111 of the glass tube 118 and the outer surface 113 of the absorber tube 112, and the space 119 can be evacuated to increase the effective insulation of the glass tube 118 by reducing conduction to the glass tube 118 and convection from the outer surface 113 of the absorber tube 112. Solar radiation reflected from each solar collector 116 is transmitted through the glass tubes 118 to impinge on the absorber tubes 112. The evacuated space 119 and, hence, the glass tubes 118, reduce the loss of heat from receiver 110 to the ambient environment. Further, the absorber tubes 112 can be painted or otherwise coated to increase the absorption of solar radiation. For example, the absorber tubes 112 can be spray painted with flat black or other dark high temperature paint to increase the thermal absorptivity of the receivers 110. Further, selective coatings can be applied to outer surfaces 113 of the absorber tubes 112 for increasing the absorptivity and reducing the emissivity or radiation loss of the receivers 110; however, such selective coatings are typically stable only to temperatures of about 750° F. In some embodiments of the invention, the receivers 110 can be provided without the glass tubes 118 or with other insulating devices.

Thus, the trough solar absorption devices 108 are structured to heat the heat transfer fluid circulated therethrough. For example, according to one embodiment of the present invention, the heat transfer fluid enters the trough solar absorption devices 108 at a temperature between about 450° F. and 650° F., such as about 550° F., and exits the trough devices 108 at a temperature between about 650° F. and 850° F., such as about 800° F. In some embodiments, the trough devices 108 can heat the fluid by about 250° F. or more.

Referring again to FIG. 3, the heat transfer fluid flows from the trough solar absorption devices 108 to the one or more tower solar absorption devices 120. Typically, the heat transfer fluid exits the trough solar absorption devices 108 heated to a temperature that is higher than the ambient conditions and higher than the temperature of the fluid in the cold thermal storage tank 130. An intermediate thermal storage tank 140 can be provided in fluid connection with the trough and tower solar absorption devices 108, 120 so that the intermediate thermal storage tank 140 can receive heated fluid from the trough devices 108 and hold the fluid until such time as when circulation to the tower device 120 is desired.

Figure 5:
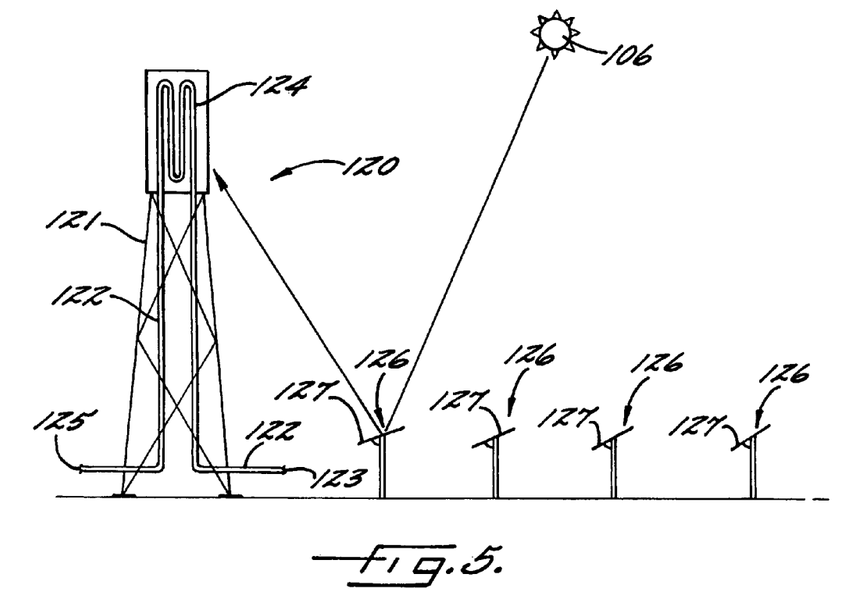
FIG. 5 is an elevation view of a tower solar absorption device of the generation system of FIG. 3.

The tower solar absorption device 120, illustrated in FIG. 5, includes a tube-type receiver 124, which can be formed of a tube, reservoir, or other conduit defining a passage for receiving and circulating the heat transfer fluid. The receiver 124 is supported by an elevated tower structure 121, which can be several hundred feet high. The receiver 124 can be configured according to the particular fluid and heating specifications of the solar-powered power generation system 100. For example, as shown in FIG. 5, the receiver 124 in the tower 120 is fluidly connected by pipes 122 or other fluid conduits that provide a single fluid circuit extending from an inlet 123 at the bottom of the tower structure 121 to the receiver 124 at the top of the structure 121 and then to an outlet 125 at the bottom of the structure 121. The pipes 122 can extend in a relatively direct path between the receiver 124 and the inlet 123 and outlet 125, while the tube of the receiver 124 can be configured in a circuitous or serpentine path to provide a greater surface area for receiving radiation directed thereto. In some embodiments of the present invention, the receiver 124 and/or the pipes 122 can provide multiple fluid paths in series and/or parallel configurations. The size of the receiver 124 can also correspond to the flow and heat requirements of the system 100. For example, in some embodiments, the receiver 124 can be formed of tubes that are less than about 1 inch in diameter. The tubes of the receiver 124 can be formed of a variety of materials, preferably a material that can be operated for extended periods of time at temperatures of at least about 750° F. and, in some cases, about 1100° F., such as a high carbon, super alloy.

The tower solar absorption device 120 also includes at least one solar collector 126 configured to direct solar radiation toward the receiver 124. For example, the solar collectors 126 can be heliostats arranged proximate to the tower structure 121. Hundreds or thousands of heliostats or other collectors 126 can be positioned to reflect solar radiation for heating fluid in the tower device 120. Each heliostat can include a planar or curved mirror 127 for reflecting solar radiation toward the receiver 124 in the tower device 120, and each heliostat can be independently adjustable in response to the relative position of the sun 106. For example, the heliostats can be arranged in arrays, the heliostats of each array being controlled separately or in combination with the other heliostats of the array by one or more control devices configured to detect and track the relative position of the sun 106. Thus, the heliostats can adjust according to the position of the sun 106 to reflect sunlight onto the receiver 124, thereby warming the heat transfer fluid in the receiver 124.

The tower solar absorption device 120 is structured to heat the fluid to a temperature higher than the temperature of the fluid in the trough devices 108. For example, according to one embodiment of the present invention, the heat transfer fluid enters the tower device 120 from the trough devices 108 or the intermediate thermal storage tank 140 at a temperature between about 650° F. and 850° F., such as about 800° F., and exits the tower device 120 at a temperature between about 850° F. and 1100° F., such as about 1050° F. In some embodiments, the tower device 120 can heat the fluid by about 250° F. or more. Advantageously, the tower device 120 can heat the fluid to a temperature at which thermal energy in the fluid can be efficiently converted to electrical energy. For example, if the fluid temperature is increased to about 1050° F., the fluid can be cooled to about 550° F. and electricity can be produced by a conventional turbine generator with an efficiency of about 40%.

Thus, the heat transfer fluid can be heated in a multi-stage operation, first being heated in one or more of the trough devices 108 and then heated to a higher temperature in one or more of the tower devices 120. As noted above, each of the solar absorption devices 108, 120 can be configured to heat the heat transfer fluid to various temperatures depending on the available solar energy, the desired minimum or maximum operation temperatures of the heat transfer fluid and the system devices, the total desired thermal energy in the heat transfer fluid, and the efficiency of each of the system devices. For example, the trough devices 108 can be operated in a temperature range at which the trough devices 108 can most economically convert solar radiation to thermal energy in the heat transfer fluid. The tower device 120 can most efficiently then further heat the heat transfer fluid to achieve a desired temperature, such as a temperature at which the thermal energy of the heat transfer fluid can be converted to electrical energy or otherwise used as desired.

The heat transfer fluid flows from the exit 125 of the tower device 120 to a hot thermal storage tank 150. When required, the heat transfer fluid is pumped from the hot thermal storage tank 150 to a power generator 160. The power generator 160 can include a variety of devices for removing or otherwise using the thermal energy of the heat transfer fluid. For example, the power generator 160 can be a conventional steam generator for transferring thermal energy from the heat transfer fluid to a separate fluid circuit holding water to thereby generate steam from the water. The steam can be delivered to a turbine 162 to rotate the turbine 162 and an electrical generator 164 coupled to the turbine 162. A condenser/preheater and cooling tower (not shown) can be used downstream of the turbine to condense and cool the steam for recirculation, as is known to those skilled in the art. Thus, the thermal energy of the heat transfer fluid can be converted to electrical energy that can be transmitted and distributed, e.g., by conventional electrical transmission devices and a distribution grid. Alternatively, the power generator 160 can be a heat exchanging device that generates a hot working fluid, such as steam, that can be delivered for heating purposes, such as for heating buildings or for industrial process heating. For example, the steam can be used as a heat source for conventional manufacturing processes or for water desalination.

The heat transfer fluid is cooled in the power generator 160 to an acceptable temperature before entering the cold storage tank 130 and subsequently the heat transfer fluid enters the trough solar absorption devices 108, e.g., between about 450° F. and 650° F. such as about 550° F. The heat transfer fluid can be circulated back to the cold thermal storage tank 130 and/or the trough devices 108. In some embodiments, the heat transfer fluid is delivered from the power generator 160 to the trough devices 108 without passing through the cold thermal storage tank 130, such that the heat transfer fluid can be reheated directly. In other embodiments, the heat transfer fluid can be stored in the cold thermal storage tank 130 before being reheated and re-circulated though system 100.

Each tank 130, 140, 150 is insulated to minimize thermal losses to the environment. Some thermal energy will be lost to the environment, though the change in the temperature of the fluid due to such losses will be minimal unless the fluid is stored for extended periods of time. In one embodiment of the present invention, the heat transfer fluid is heated and delivered to the intermediate and hot storage tanks 140, 150 and stored in the tanks 140, 150 for subsequent power generation or reheating. For example, if sufficient solar radiation is available for heating fluid from the trough devices 108 and/or the intermediate thermal storage tank 140, the fluid can be heated in the tower device 120. The tower device 120 is designed to heat more fluid than that which is necessary for generating the desired amount of power in the power generator 160, and this excess fluid is stored in the hot thermal storage tank 150. Subsequently, if the tower device 120 is unable to heat fluid for generating the desired power in the power generator 160, i.e., during nighttime, cloud cover, and the like, the hot fluid from the storage tank 150 can be delivered to the generator 160. Thus, the hot thermal storage tank 150 allows the timing of power generation to be shifted from the time of the absorption of solar energy, thereby allowing power to be generated during night or other periods of relative darkness, during maintenance of the system components, and the like. Additionally, power can be generated according to the need for or current market value of electricity, or according to other factors.

Similarly, heat transfer fluid that is heated in the trough devices 108 can be stored in the intermediate thermal storage tank 140 for subsequent circulation through and/or heating in the tower device 120. For example, if the trough devices 108 are operating and the tower device 120 is not operational, if the trough devices 108 are heating more fluid than the tower device 120, or if subsequent nonoperability of the trough devices 108 is anticipated during a period of planned operation of the tower device 120, some or all of the fluid from the trough devices 108 can be delivered to the intermediate storage tank 140. The use of the intermediate storage tank 140 is optional; however, a loss in plant operability as described previously may occur.

The cold thermal storage tank 130 can also be used to receive fluid from the power generator 160 even if the trough and/or tower devices 108, 120 are not being operated. For example, if heat transfer fluid from the hot thermal storage tank 150 is used for operation of the power generator 160 when the trough and tower devices 108, 120 are not operated, such as at night or during maintenance of the devices, as described above, the fluid can be delivered from the power generator 160 to the cold thermal storage tank 130.

Thus, the operation of the power generator 160 need not be restricted to those times when solar energy is available for heating the fluid. Therefore, the system 100 is characterized by improved dispatchability, i.e., increased flexibility to dispatch power therefrom according to a desired schedule. In some embodiments, the trough and tower devices 108, 120 have sufficient capacity to heat enough fluid during a daytime when solar energy is available such that the fluid can be used to operate the power generator 160 during nighttime when solar energy is not available. Thus, the system 100 can be operated continuously during daytime and nighttime. In other embodiments, the power generator 160 can be operated to generate power when power is required or when power prices are high, and operation can be slowed or stopped when power is not needed or when power prices are low. For example, the system 100 can operate to heat the fluid according to the availability of sunlight, with power being generated according to a current or anticipated desire for or market value of electricity.

If there is insufficient solar radiation for heating the heat transfer fluid in the trough and/or tower solar absorption devices 108, 120, such as at night or other times of darkness, the fluid can continue to circulate through the devices or the fluid can be drained therefrom. To reduce heat loss and preclude freezing, for example, the heat transfer fluid can be drained from the tower device 120 to the hot thermal storage tank 150 and/or the intermediate thermal storage tank 140. The fluid in the trough devices 108 can be drained to the intermediate thermal storage tank 140 and/or the cold thermal storage tank 130. Depending on the size and configuration of the tower and trough devices 108, 120, the fluid can be drained within a relatively short time. For example, in some embodiments, the fluid can be drained from the trough devices 108 in a few minutes and from the tower device 120 in less than a minute. The devices 108, 120 can also be drained at other times when the devices 108, 120 are not heating the fluid, such as during times of maintenance, poor weather, and the like. Alternatively, during periods when the trough and/or tower solar absorption devices 108, 120 are not heating the fluid or not substantially heating the fluid, the fluid can continue to circulate through the devices 108, 120. For example, if solar radiation is not available due to cloud cover or other weather or atmospheric conditions, the circulation of fluid can be continued until solar radiation is again available or a decision is made to interrupt operation. Further, heaters can be provided for heating the fluid in the storage tanks 130, 140, 150, and components of the absorption devices 108, 120 to maintain minimum operating temperatures throughout the system 100.

Figure 6:
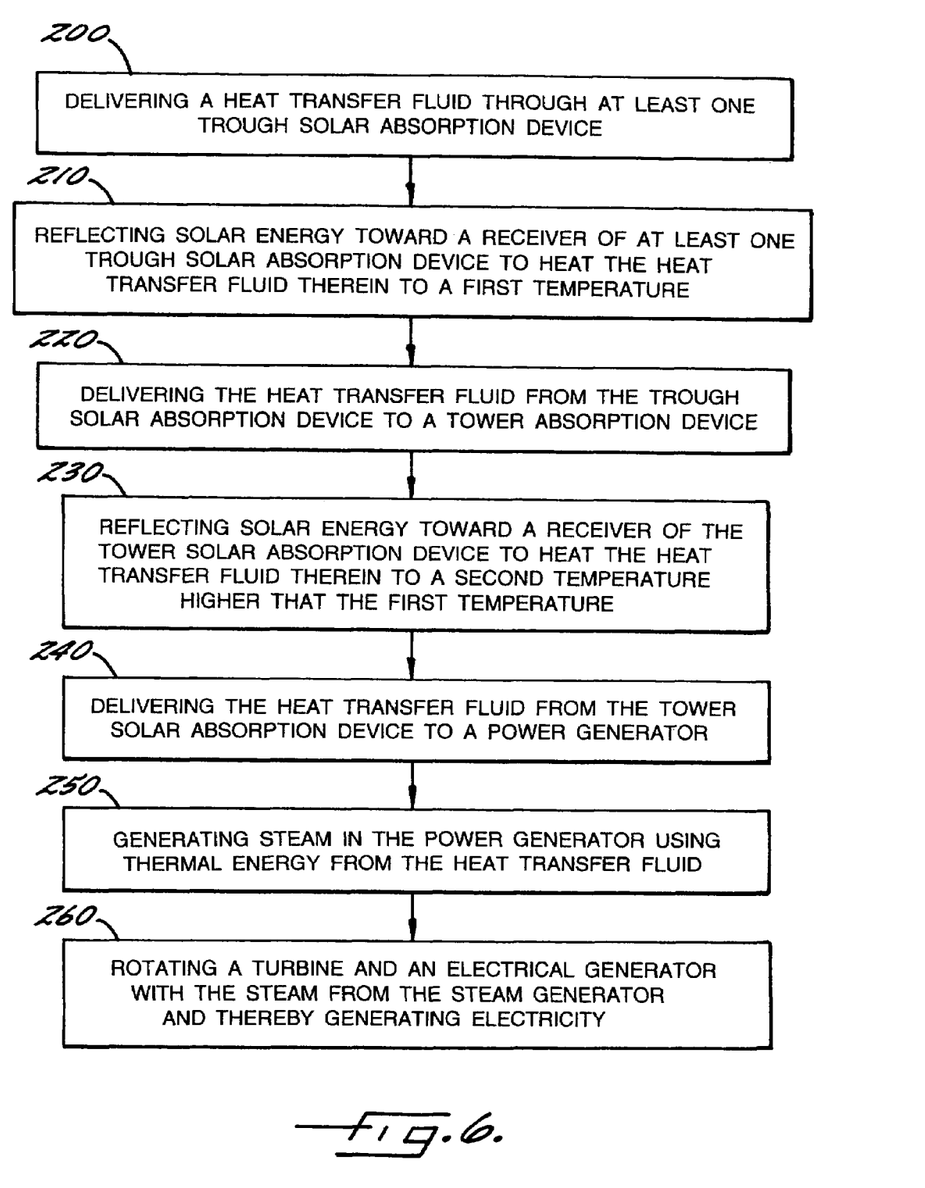
FIG. 6 is a block diagram illustrating the operations for generating power using solar energy according to one embodiment of the present invention.

The operations for generating power using solar energy according to one embodiment of the present invention are illustrated in FIG. 6. It is understood that some of the illustrated operations can be omitted from the method and additional operations can be performed without departing from the scope of this invention. As shown in Block 200, the heat transfer fluid is delivered through at least one trough solar absorption device. Solar energy is reflected toward the receiver to heat the heat transfer fluid to a first temperature. See Block 210. Thereafter, the heat transfer fluid is delivered to a tower absorption device. See Block 220. Solar energy is reflected toward the receiver of the tower solar absorption device to heat the heat transfer fluid to a second temperature, which is higher than the first temperature. See Block 230. Next, the heat transfer fluid is delivered from the tower solar absorption device to a power generator. See Block 240. For example, the power generator can include a steam generator in which thermal energy from the heat transfer fluid is used to generate steam. See Block 250. The heat transfer fluid can be returned from the power generator to the trough solar absorption device to complete a closed fluid cycle. The steam can be used to rotate a turbine and generate electricity or other purposes, as discussed above. See Block 260. Subsequently, the steam from the turbine can be condensed and returned as water to the steam generator to complete a closed fluid cycle.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A solar-powered power generation system, the system comprising:
   at least one trough solar absorption device, each trough solar absorption device having a receiver defining a passage for receiving a heat transfer fluid and a solar collector configured to direct solar radiation toward the receiver of the trough solar absorption device to heat the heat transfer fluid therein to a first temperature; and
   a tower solar absorption device configured to receive the heat transfer fluid from the at least one trough solar absorption device, the tower absorption device including a receiver for receiving the heat transfer fluid and a solar collector configured to direct solar radiation toward the receiver of the tower solar absorption device to heat the heat transfer fluid therein to a second temperature higher than the first temperature.

2. A solar-powered power generation system according to claim 1 wherein the at least one trough solar absorption device is configured to heat the heat transfer fluid to a temperature of between about 650° F. and 850° F.

3. A solar-powered power generation system according to claim 1 wherein the at least one tower solar absorption device is configured to heat the heat transfer fluid to a temperature of between about 850° F. and 1100° F.

4. A solar-powered power generation system according to claim 1 wherein the solar collector of the tower solar absorption device includes at least one heliostat.

5. A solar-powered power generation system according to claim 1 wherein the solar collector of the trough solar absorption device includes at least one parabolic mirror.

6. A solar-powered power generation system according to claim 1, further comprising a fluid storage tank configured to receive the heat transfer fluid from the trough solar absorption device, the tower solar absorption device being configured to receive the heat transfer fluid from the tank, and the tank being structured to substantially maintain a temperature of the heat transfer fluid therein.

7. A solar-powered power generation system according to claim 1, further comprising the heat transfer fluid circulated through the at least one trough solar absorption device and the tower solar absorption device, wherein the heat transfer fluid is a molten salt.

8. A solar-powered power generation system, the system comprising:
   at least one trough solar absorption device, each trough solar absorption device having a receiver defining a passage for receiving a heat transfer fluid and a solar collector configured to direct solar radiation toward the receiver of the trough solar absorption device to heat the heat transfer fluid therein to a first temperature;
   a tower solar absorption device configured to receive the heat transfer fluid from the at least one trough solar absorption device, the tower absorption device including a receiver for receiving the heat transfer fluid and a solar collector configured to direct solar radiation toward the receiver of the tower solar absorption device to heat the heat transfer fluid therein to a second temperature higher than the first temperature; and
   a power generator configured to receive the heat transfer fluid from the tower solar absorption device and remove thermal energy from the heat transfer fluid, thereby cooling the heat transfer fluid to a third temperature.

9. A solar-powered power generation system according to claim 1 wherein the at least one trough solar absorption device is configured to heat the heat transfer fluid to a temperature of between about 650° F. and 850° F.

10. A solar-powered power generation system according to claim 1 wherein the at least one tower solar absorption device is configured to heat the heat transfer fluid to a temperature of between about 850° F. and 1100° F.

11. A solar-powered power generation system according to claim 1 wherein the power generator is configured to cool the heat transfer fluid to a temperature of between about 450° F. and 650° F.

12. A solar-powered power generation system according to claim 1 wherein the solar collector of the tower solar absorption device includes at least two heliostats.

13. A solar-powered power generation system according to claim 1 wherein the solar collector of the trough solar absorption device includes at least one parabolic mirror.

14. A solar-powered power generation system according to claim 1, further comprising a fluid storage tank configured to receive the heat transfer fluid from the trough solar absorption device, the tower solar absorption device being configured to receive the heat transfer fluid from the tank, and the tank being structured to substantially maintain a temperature of the heat transfer fluid therein.

15. A solar-powered power generation system according to claim 1 wherein the power generator is a steam generator configured to use thermal energy from the heat transfer fluid to generate steam.

16. A solar-powered power generation system according to claim 15 wherein the power generator includes a turbine and an electrical generator, the turbine being fluidly connected to the steam generator and the electrical generator being coupled to the turbine such that the turbine is configured to be rotated by the steam, thereby rotating the electrical generator and generating electricity.

17. A solar-powered power generation system according to claim 1, further comprising first and second fluid storage tanks, the first fluid tank being fluidly connected to the power generator and the at least one trough solar absorption device, the first fluid tank being configured to receive the heat transfer fluid from the power generator at about the third temperature and deliver the heat transfer fluid to the at least one trough solar absorption device, and the second fluid tank being fluidly connected to the tower solar absorption device and configured to receive the heat transfer fluid from the tower solar absorption device at about the second temperature and deliver the heat transfer fluid to the power generator.

18. A solar-powered power generation system according to claim 1, further comprising the heat transfer fluid circulated through the at least one trough solar absorption device, the tower solar absorption device, and the power generator, wherein the heat transfer fluid is a molten salt.

19. A solar-powered power generation system according to claim 1 wherein the at least one trough solar absorption device is fluidly connected to the power generator and configured to receive the heat transfer fluid therefrom such that the at least one trough solar absorption device, the tower solar absorption device, and the power generator are configured to circulate the heat transfer fluid continuously.

20. A method of generating power using solar energy, the method comprising:
    delivering a heat transfer fluid through at least one trough solar absorption device, each trough solar absorption device including a receiver defining a passage for receiving the heat transfer fluid;
    reflecting solar energy toward the receiver of the at least one trough solar absorption device, thereby heating the heat transfer fluid therein to a first temperature;
    delivering the heat transfer fluid from the trough solar absorption device to a tower absorption device, the tower absorption device including a receiver defining a passage for receiving the heat transfer fluid;
    reflecting solar energy toward the receiver of the tower solar absorption device, thereby heating the heat transfer fluid therein to a second temperature higher than the first temperature; and
    delivering the heat transfer fluid from the tower solar absorption device to a power generator.

21. A method according to claim 20 wherein said first reflecting step comprises heating the heat transfer fluid to a temperature of between about 650° F. and 850° F.

22. A method according to claim 20 wherein said second reflecting step comprises heating the heat transfer fluid to a temperature of between about 850° F. and 1100° F.

23. A method according to claim 20 wherein said second reflecting step comprises reflecting solar radiation toward the tower solar absorption device with a plurality of heliostats.

24. A method according to claim 20 wherein said first reflecting step comprises reflecting solar radiation toward the trough solar absorption device with at least one parabolic mirror.

25. A method according to claim 20 wherein said second delivering step comprises delivering the heat transfer fluid from the trough solar absorption device to a fluid storage tank at about the first temperature and subsequently delivering the heat transfer fluid from the tank to the tower solar absorption device.

26. A method according to claim 20, further comprising delivering the heat transfer fluid at a third temperature from the power generator to a first fluid storage tank and delivering the heat transfer fluid from the first tank to the at least one trough solar absorption device.

27. A method according to claim 20, further comprising delivering the heat transfer fluid from the tower solar absorption device at the second temperature to a second fluid storage tank and delivering the heat transfer fluid from the second tank to the power generator.

28. A method according to claim 20 wherein the heat transfer fluid is a molten salt.

29. A method according to claim 20, further comprising circulating the heat transfer fluid continuously through the at least one trough solar absorption device, the tower solar absorption device, and the power generator.

30. A method according to claim 20, further comprising generating steam in the power generator using thermal energy from the heat transfer fluid.

31. A method according to claim 30 wherein said generating step comprises cooling the heat transfer fluid in the power generator to a third temperature lower than the first temperature.

32. A method according to claim 31 wherein said generating step comprises cooling the heat transfer fluid to a temperature of between about 450° F. and 650° F.

33. A method according to claim 30, further comprising rotating a turbine and an electrical generator with the steam from the steam generator and thereby generating electricity.

* * * * *